(12) United States Patent
Pratt

(10) Patent No.: US 6,539,305 B2
(45) Date of Patent: Mar. 25, 2003

(54) POSITIONING APPARATUS AND METHOD

(76) Inventor: Anthony R. Pratt, Harrietsham House, 214 Dunchurch, Rugby, Warwickshire CV22 6 HR (GB)

( * ) Notice: Subject to any disclaimer, the term of this patent is extended or adjusted under 35 U.S.C. 154(b) by 0 days.

(21) Appl. No.: 10/074,993

(22) Filed: Feb. 13, 2002

(65) Prior Publication Data

US 2002/0183925 A1 Dec. 5, 2002

Related U.S. Application Data

(63) Continuation of application No. 09/584,659, filed on May 30, 2000, now abandoned.

(30) Foreign Application Priority Data

May 26, 1999 (GB) .............................................. 9912329
May 26, 2000 (GB) ................................. PCT/GB00/02055

(51) Int. Cl.$^7$ .............................................. G01S 21/00
(52) U.S. Cl. ....................... 701/213; 701/207; 340/990; 340/995; 342/257.12
(58) Field of Search ................................ 701/207, 213, 701/214, 215, 220, 225; 342/357.12, 450, 451, 452, 358; 340/988, 990, 995; 380/274

(56) References Cited

U.S. PATENT DOCUMENTS 5,535,278 A * 7/1996 Cahn et al. .................. 380/274
5,884,214 A * 3/1999 Krasner ....................... 701/207

* cited by examiner

Primary Examiner—William A. Cuchlinski, Jr.
Assistant Examiner—Marthe Y. Marc-Coleman
(74) Attorney, Agent, or Firm—Kilpatrick Stockton LLP

(57) ABSTRACT

Positioning apparatus for use in a moving vehicle includes circuitry arranged to process signals received from GPS satellites, and to provide signals in response thereto from which the position of the apparatus can be calculated at a remote station. The apparatus provides, for each satellite in view, carrier frequency estimation signals, samples of the carrier signals and code tracking signals to a data transmission device, which modulates the signals onto a carrier prior to transmission to the remote station. A carrier loop reconstruction device and a location processor in the remote station co-operate to determine the location of the positioning apparatus. A memory device may record signals received over a period of time, from which mission replay may be performed.

13 Claims, 2 Drawing Sheets

POSITIONING APPARATUS AND METHOD

This application is a continuation of application Ser. No. 09/584,659 filed May 30, 2000 abandoned.

FIELD OF THE INVENTION

This invention relates to positioning apparatus, and in particular to positioning apparatus suitable for determining the position of a moving vehicle, and to a positioning method.

BACKGROUND OF THE INVENTION

Tracking of the position of high dynamic moving vehicles whilst in flight is desirable for many reasons, particularly as it can allow the location of a vehicle to be accurately determined even though the location may not be visible from a viewing site.

For this purpose, it is known to use a translator device forming part of the vehicle, and a base or ground station remote from the vehicle. The translator device receives positioning signals from a number of satellites of, for example, the GPS constellation, and amplifies and frequency translates the signals before transmitting them as translator signals to the base station. A positioning receiver in the base station then processes the translator signals to determine position information relating to the translator device and thus the host vehicle. By recording the translator signals, the base station can plot the path of the vehicle accurately and with whatever time intervals are required, after the vehicle's flight.

Although translator systems are immune to the effects of acceleration bursts, the bandwidth required for transmission of the translator signals is very high, for example, at least 5 Mbits per second needing to be transmitted for GPS satellite signals It has been proposed, for use in meeting the proposed "enhanced—911" US wireless telephone requirement, to include simplified GPS receivers in wireless telephones. Such receivers include circuitry arranged to process positioning signals transmitted by the satellites, to determine interim position information. Extraction of the data carried on the positioning signals is carried out at a base or ground station, which can thereby calculate position information relating to the GPS receiver and thus the wireless telephone.

Such a system is beneficial in that it removes a substantial processing burden from the wireless telephone, yet allows rapid determination of its position. Furthermore, the accuracy of location determination of such a system can easily be increased through the use of differential GPS techniques.

SUMMARY OF THE INVENTION

According to this invention, there is provided positioning apparatus for use in a moving vehicle comprising:
  a receiver for receiving coded ranging signals from each of a plurality of remote transmitters including at least one positioning satellite;
  a code correlator device arranged to correlate a locally provided code with the code contained in modulation of the coded ranging signals, and to provide correlator output signals in response thereto;
  a code tracking device responsive to at least some of the correlator output signals to provide code tracking output signals;
  a carrier frequency estimator device, arranged to receive at least some of the correlator output signals, to estimate the carrier frequency of the coded ranging signals, and to provide carrier frequency estimation signals in response thereto;
  a carrier sampling device arranged to receive and to sample at least some of the correlator output signals to provide carrier sample signals from which information about the phase of a carrier of the coded ranging signals can be determined; and
  a transmitter arranged to receive the code tracking output signals, the carrier sample signals and the carrier frequency estimation signals, and to transmit signals which are representative of the code tracking output signals, the carrier sample signals and the carrier frequency estimation signals, to allow position information relating to the apparatus to be determined by further processing at a location remote from the vehicle.

In this way, it is possible to construct positioning apparatus which is capable of providing precision position tracking and which is less susceptible to losing tracking lock than apparatus where the position calculation is performed in the vehicle mountable device, especially where high values of acceleration and jerk may be experienced. In addition, the bandwidth required for transmitting the relevant signals to a ground or other remotely located base station can be considerably less than that required for the translator system mentioned above.

Preferably, the carrier frequency estimator device comprises a frequency locked loop to reduce data rates and therefore the bandwidth required for transmission between the positioning apparatus and a ground station. Alternatively, an open loop carrier frequency estimation device may be used. A sampler may be arranged to sample the correlator output signals at intervals which are substantially aligned with the data bit periods. This offers simple retrieval of data from the positioning signals.

Embodiments of the invention will now be described, by way of example only, with reference to the accompanying drawings.

DETAILED DESCRIPTION OF THE PREFERRED EMBODIMENTS

Figure 1:
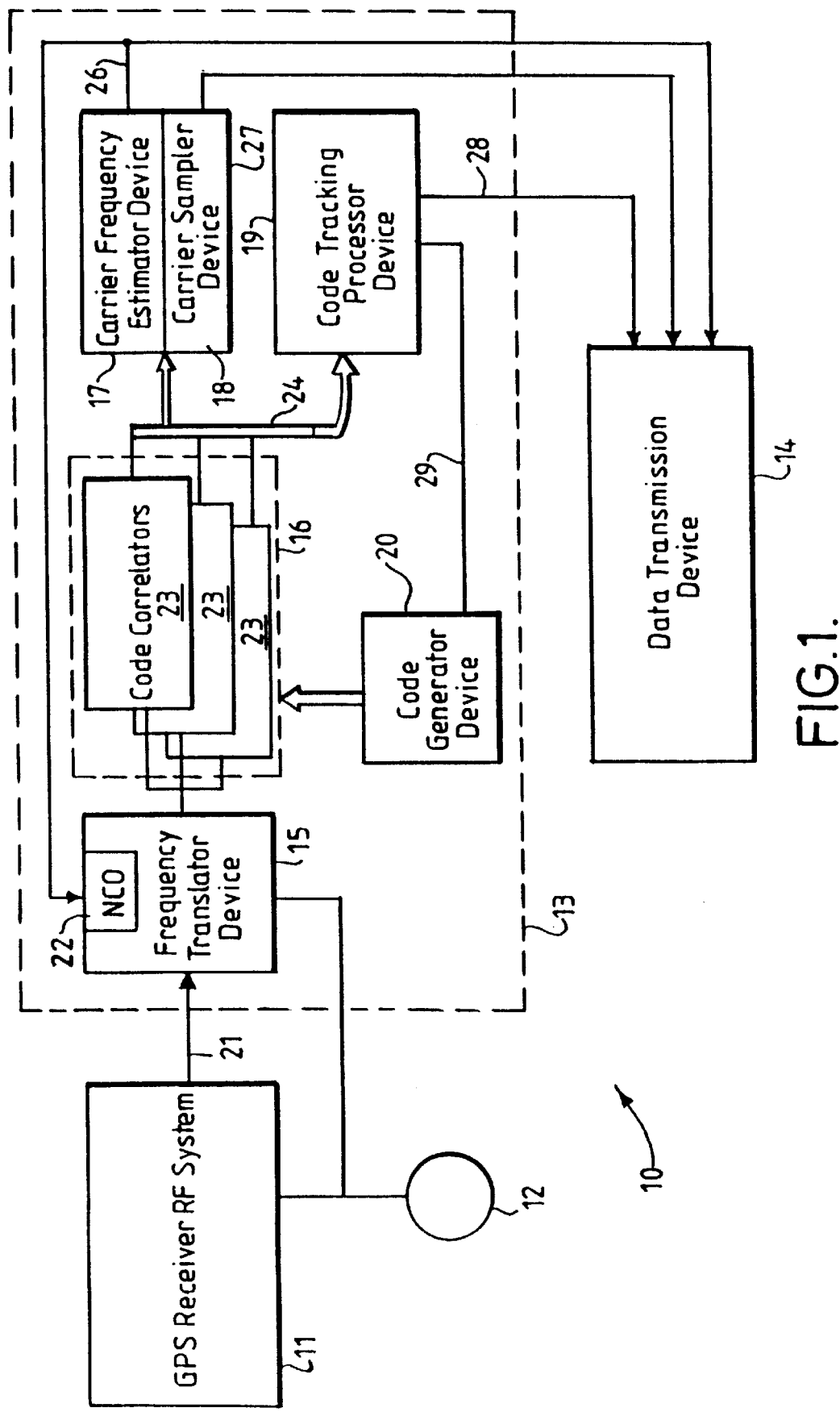
FIG. 1 shows positioning apparatus in accordance with the invention for mounting on a host vehicle.

Referring to FIG. 1, positioning apparatus 10 comprises generally a Global Positioning System (GPS) Radio Frequency (RF) receiver 11, a 20 z reference frequency oscillator 12, a GPS signals processor 13 and a data transmission device 14. The apparatus 10 is mountable with a host vehicle (not shown) which is mounted externally of the vehicle or behind or within a structure of RF transparent material forming part of the body of the host vehicle.

The GPS signal processor 13 comprises generally a frequency translator device 15, a code correlator device 16, a carrier frequency estimator device 17, a carrier sampling device 18, a code tracking processor device 19 and a code generator device 20. A plurality of GPS signal processors are provided in the positioning apparatus 10 to allow improved satellite acquisition time. The operation of the frequency translator device 15, the code correlator device 16, the code tracking processor device 19 and the code generator device 20 is conventional.

The frequency translator device 15 downconverts positioning signals, which are provided by the GPS receiver 11 on an output 21, by mixing them with signals provided by the reference frequency oscillator 12. The frequency translator device 15 further mixes the downconverted signals with in-phase and quadrature versions of a replica carrier frequency signal provided by a numerically controlled oscillator (NCO) 22 to provide in-phase and quadrature baseband versions of the positioning signals. These baseband versions are each provided to two correlators of four or six correlators 23 present in the code correlator device 16. An in-phase and a quadrature correlator of the correlator device 16 are provided a prompt version of a replica of the code which is modulated onto the positioning signals, and the other two or four correlators are provided with a one-chip early minus late version of the replica code. Of course, other schemes of early, prompt and late codes may be used. The correlators 23 include up/down counters (not shown) which are clocked at the frequency of the reference oscillator 12. The count of an up/down counter is incremented every clock pulse that an input signal is positive, and decremented every clock pulse that the input signal is negative. The count is not changed at clock pulses where the input signal is zero.

The up/down counters of the code correlator device 16 provide their count on an output 23 as correlator output signals. The correlator output signals are received at and are used by the code tracking processor device 19 to provide code tracked feedback signals, via an output 29, to the code generator device 20. These feedback signals allow the code replica signals to be synchronised with the received code.

The code tracking device 20 also provides code tracking signals to the data transmission device 14. The code tracking signals are derived from the in-phase and the quadrature correlators, which are provided with the early minus late version of the replica code.

The correlator output signals provided by the prompt correlators are provided to the carrier frequency estimator device 17 and to the carrier sampler device 18. The carrier frequency estimator device 17 samples the correlator output signals at 2 milliseconds intervals. The carrier phase measurement device 18 samples the correlator output signals at 40 microsecond intervals. 40 microsecond intervals correspond to a sampling frequency of 25 kHz which is twice the maximum expected frequency uncertainty of 12 kHz. Carrier sample signals, from which the phase of the carrier signal can be obtained, are provided by the carrier phase measurement device on an output 27. Since these signals are useful only when there is substantial alignment of the replica code with the received code, these signals are provided only when substantial code alignment is present. The carrier sample signals are received by the data transmission device 14, which is connected to the output 27. The 2 millisecond interval samples are processed by the carrier frequency estimation device 17 to obtain an approximation of the frequency of the carrier of the positioning signals. The carrier frequency estimator device 17 provides carrier frequency estimation signals, which are representative of the estimated carrier frequency, to a control input of the NCO 22 and to the data transmission device 14 via an output 26. Data signals identifying the phase of the NCO 22 at the times when the frequency of the carrier NCO 22 is changed are also provided to the data transmission device.

The carrier frequency estimation device 17 is controlled to provide updated carrier frequency estimation signals every 100 ms. The carrier frequency estimation signals control the NCO 22 to oscillate at the estimated carrier frequency, which allows the signals provided to the code correlator device 16 to be of a suitably low bandwidth that the difference frequency is within the pass band of the filter formed by the sampling of the up/down counters by the carrier frequency estimation device 17. The correlator output signals are eight bit samples, which provide satisfactory signal representation and do not introduce significant levels of noise. The carrier frequency estimation signals comprise six byte digital values.

A vehicle exhibiting acceleration bursts of 20 g (196 m/s$^2$) will experience a change in velocity of 28 m/s in 100 ms. The 100 ms update interval of the carrier frequency estimation signals allows the frequency of the carrier to change by 107 Hz between carrier frequency updates at maximum acceleration, assuming that there is no frequency change due to other factors, that there is accurate carrier frequency estimation, and assuming instant control of the frequency of the NCO 22. Alternatively, aliasing of the carrier signal is controlled by a pre-transmission filter provided within the carrier frequency estimator device 17.

Where acceleration averaging more than 20 g over periods of time exceeding 100 ms is possible from the host vehicle, the update frequency of the carrier frequency estimation signals is increased. If it were not increased, the difference between the actual and the estimated frequency would be likely to exceed a maximum tolerable error of 150 Hz. Frequency differences exceeding this amount may cause incorrect position measurements to be obtained. The arrangement of the carrier frequency estimator device 17 and the NCO 22 substantially reduces the carrier tracking stress which is caused by motion of the host vehicle.

The code tracking processor device 19 provides code tracking output signals via an output 28 to the data transmission device 14. These code tracking signals provide pseudo-range estimates for each satellite being tracked.

Figure 2:
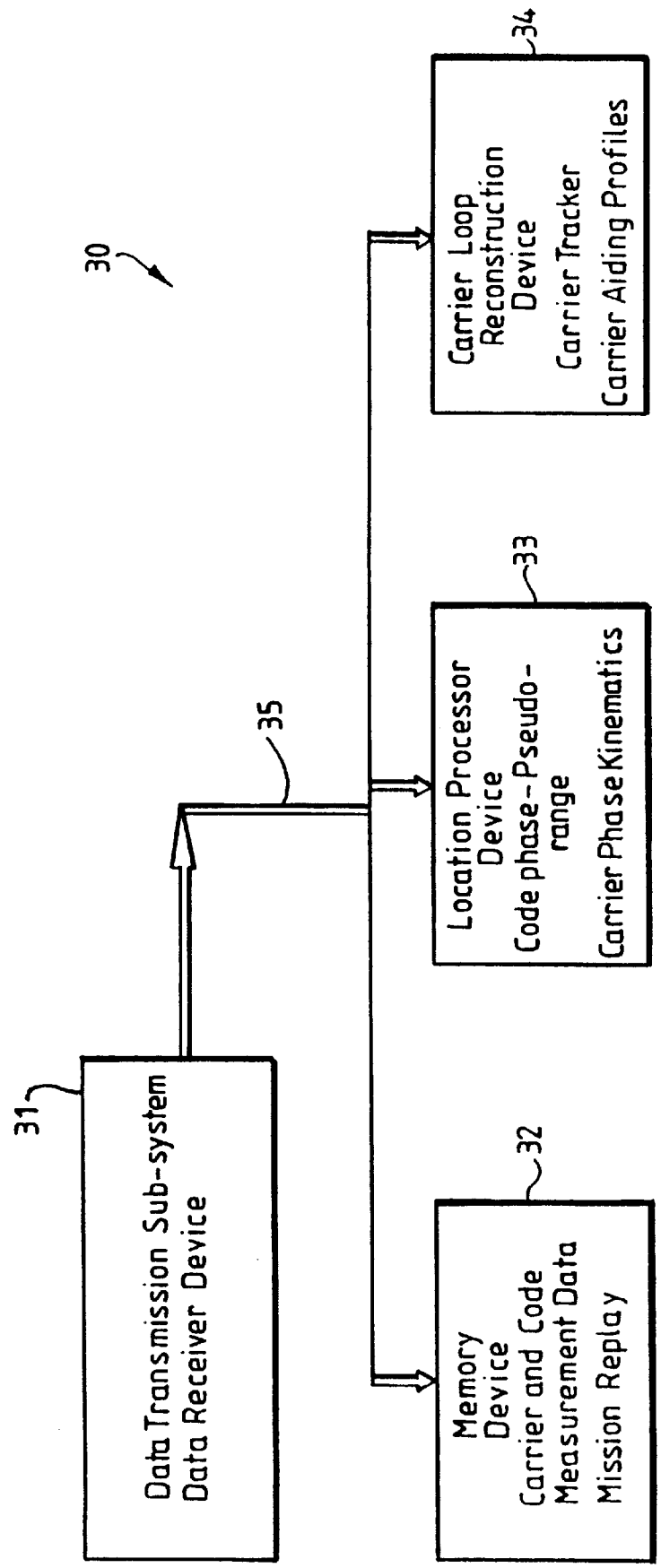
FIG. 2 shows ground based processing apparatus for use with the FIG. 1 positioning apparatus.

The data transmission device 14 receives, therefore, three different signals which, although they are all in digital form, are of different natures and are provided at different update intervals. These signals are interleaved to form a composite signal which is modulated onto an RF carrier signal and transmitted from an antenna (not shown). Alternatively, the carrier frequency estimation signals, the carrier sample signals and the code tracking output signals are modulated onto respective RF carriers and transmitted from the antenna as discrete signals. In either case, the carrier NCO phase data signals form part of the carrier frequency estimation signals. The signals transmitted by the data transmission system 14 of the vehicle mounted positioning apparatus 10 are received at a ground station 30, which is shown in FIG. 2.

The ground station 30 comprises a data receiver device 31, which receives the signals transmitted by the positioning apparatus 10, and demodulates the signals to reproduce the carrier frequency estimation signals, the carrier sample signals and the code tracking output signals data. The data receiver device 31 provides this data to a memory device 32, to a location processor device 33, and to a carrier loop reconstruction device 34, via an output 35.

The carrier loop reconstruction device 34 includes a processor (not shown) which detects, using carrier aiding profiling and other carrier tracking software, the phase and the frequency of the carrier signals, as experienced by the positioning apparatus 10, to a high degree of accuracy. Data representing the frequency and phase of the carrier signals is provided to the location processor device 33.

The carrier signal frequency and phase data is stored in the memory device 32, as is the data provided by the data receiver device 31.

The location processor 33 includes a pseudo-range measurement device (not shown) which obtains positioning information such as an estimation of the distance between the satellite which transmitted the positioning signals and the positioning apparatus 10, by detecting the phase of the modulating code. The location processor 33 includes also a data extraction device (not shown) arranged to demodulate the data present on the positioning signals transmitted by the satellites. The location processor device 33 is arranged to calculate the position of the positioning apparatus at any given moment in time from the data provided to it by the carrier loop reconstruction device 34 and the data receiver device 31. The intervals at which real time position calculations can be made is dependent primarily of the processing resources possessed by the location processor device 33.

Position calculations can be made at intervals which exceed the intervals obtainable at real time through the playback of data from the memory device 32 after the flight of the host vehicle. This feature, which can be described as post mission playback, allows specified portions of the vehicle's flight to be analysed in detail.

In an alternative embodiment, the carrier frequency estimator device 17 comprises a frequency locked loop. In this embodiment, control of the carrier replica generator is performed automatically.

The frequency locked loop takes complex samples of the correlator outputs from the early and late correlators 24 and 25. The samples are eight bit samples which are made at 10 millisecond intervals. The sampling intervals are aligned with the data bit period of the data signals transmitted by the satellite. Such alignment allows simple retrieval of the data from the positioning signals. The carrier signal to noise ratio in the resulting 25 Hz bandwidth is in the range +6 dB to +30 dB. Since the samples are eight bit samples, insignificant levels of noise are introduced into the sampled signals. Revised carrier frequency estimation signals are calculated and provided at the sampling frequency. The carrier frequency estimation signals in this case comprise three bytes of carrier NCO phase information and three bytes of carrier frequency information. Therefore, six bytes of data comprising the carrier frequency estimation signals are provided to the NCO 22 and to the data transmission device 14 once in every sample period, that is once every 10 milliseconds.

As with the first embodiment, the carrier sample device 18 provides 25 kHz samples of the correlator output signals on its output 27. However, the carrier loop reconstruction device 34 is arranged to track the carrier signals with a loop closure arrangement including a frequency locked loop instead of a phase locked loop.

The advantages of the frequency locked loop embodiment subsist in a reduced amount of data, which results in reduced bandwidth for transmission between the vehicle mountable device 10 and the ground station device 30. The carrier frequency tracking errors obtained using this apparatus are less than those obtained using the first above discussed embodiment.

In each embodiment, the ground station 30 includes also a differential GPS (DGPS) receiver (now shown), as is known in the art. The DGPS receiver applies corrections to the position information data calculated from the signals received at the positioning apparatus 10 to compensate for inaccuracies resulting from, for example, selective availability errors in ephemeris data and atmospheric propagation group delay. This feature also allows the ground processor to have knowledge of the data bit edges.

The positioning apparatus 10 is further provided with a data input port (not shown). In this way, the apparatus 10 may be loaded with data prior to launch of its host vehicle. This data includes time information to set a clock (not shown) within the apparatus 10 data indicating the identities of the satellites which are in view, to reduce searching time and to allow processing resources to be allocated to other tasks, and ephemeris data. Alternatively, the positioning apparatus may be aware which satellites are in view through conventional techniques.

Where the positioning apparatus 10 is to acquire satellite signals rapidly, the apparatus 10 is further provided with an initial frequency estimator device (not shown). This feature is of particular benefit where the positioning apparatus is not able to receive positioning signals from satellites prior to launch of its host vehicle. This may occur for example, where the host vehicle is launched from a metallic launch tube. The frequency estimator device may utilise either a Fast Fourier Transform (FFT) processor, or an aliasing and leakage reducing processor.

What is claimed is:

1. Positioning apparatus for use in a moving vehicle comprising:

a receiver for receiving coded ranging signals from each of a plurality of remote transmitters including at least one positioning satellite;

a code correlator device arranged to correlate a locally provided code with the code contained in modulation of the coded ranging signals, and to provide correlator output signals in response thereto;

a code tracking device responsive to at least some of the correlator output signals to provide code tracking output signals;

a carrier frequency estimator device, arranged to receive at least some of the correlator output signals, to estimate the carrier frequency of the coded ranging signals, and to provide carrier frequency estimation signals in response thereto;

a carrier sampling device arranged to receive and to sample at least some of the correlator output signals to provide carrier sample signals from which information about the phase of a carrier of the coded ranging signals can be determined; and a transmitter arranged to receive the code tracking output signals, the carrier sample signals and the carrier frequency estimation signals, and to transmit signals which are representative of the code tracking output signals, the carrier sample signals and the carrier frequency estimation signals, to allow position information relating to the apparatus to be determined by further processing at a location remote from the vehicle.

2. Apparatus according to claim 1, wherein the carrier frequency estimator device comprises a frequency locked loop.

3. Apparatus according to claim 2, wherein the carrier frequency estimator device comprises a sampler arranged to sample the at least some correlator output signals at intervals which are substantially aligned with received data signals.

4. Apparatus according to claim 1, further comprising a carrier phase estimator device, arranged to receive at least some of the correlator output signals, to estimate the carrier phase of the coded ranging signals, and to provide carrier phase estimation signals in response thereto.

5. Apparatus according to claim 4, in which the transmitter is arranged to transmit the carrier phase estimation signals.

6. A positioning system comprising apparatus according to claim 1, and a remote station arranged to receive the signals transmitted from the said apparatus and to calculate the position of the said apparatus.

7. A method of determining position information relating to a vehicle, the method comprising:

in a receiver associated with a vehicle:
- receiving coded ranging signals from each of a plurality of remote transmitters including at least one positioning satellite;
- correlating a locally provided code with the code contained in modulation of the coded ranging signals, and provided correlated output signals in response thereto:
- tracking at least some of the correlated output signals, and providing code tracking output signals in response thereto;
- estimating the frequency of the carrier of the coded ranging signals from the correlated output signals, and providing carrier frequency estimation signals in response thereto;
- sampling at least some of the correlated output signals to provide carrier sample signals from which information about the phase of the carrier of the coded ranging signals can be determined; and
- transmitting signals representative of the code tracking output signals, the carrier sample signals and the carrier frequency estimation signals; and in a remote station, processing the transmitted signals to determine position information relating to the vehicle.

8. A method according to claim 7, in which the estimating the carrier frequency step includes sampling the at least some correlated output signals at intervals which are substantially aligned with received data signals.

9. A method according to claim 7, further comprising estimating the phase of the carrier of the coded ranging signals from the correlated output signals, and providing carrier frequency estimation signals in response thereto.

10. Apparatus for calculating the position of a vehicle mounted receiver which moves remotely from the apparatus and which receives coded ranging signals from each of the plurality of transmitters including at least one positioning satellite, the apparatus comprising:

- a wireless data receiver for receiving data signals from the remotely moving receiver;
- a carrier loop reconstructor device arranged to receive carrier frequency estimation signals and carrier sample signals contained in the data signals received at the wireless data receiver from the remote receiver, to detect the phase and the frequency of carrier signals received from said transmitters at the remote receiver on the basis thereof, and to provide carrier output signals in response thereto;
- a pseudo-range measurement device arranged to receive code tracking signals contained in the data signals received at the wireless data receiver, to determine the positioning information relating to the remote receiver on the basis thereof, and to provide positioning signals in response thereto; and
- a location calculator arranged to calculate a location of the remote receiver on the basis of the carrier output signals and the positioning signals.

11. Apparatus according to claim 10, further comprising a memory for storing data received at the wireless data receiver, and a controller for controlling data flow from the memory to the carrier loop reconstructive device and to the pseudo-range measurement device.

12. Apparatus according to claim 1, further comprising a frequency translator device which includes a local oscillator source and is arranged to frequency translate the coded ranging signals prior to delivery of said ranging signals to the code correlator device, and a feedback link between the carrier frequency estimator device and the local oscillator source for adjusting the local oscillator source in response to said carrier frequency estimation signals.

13. Apparatus according to claim 12, wherein the carrier frequency estimator device is arranged to sample the correlator output signals thereby to act as a bandpass filter for signals delivered to the code correlator device.

* * * * *